INVENTOR.
WILLIAM J. RIDDLE
BY Joseph Januszkiewicz
ATTY.

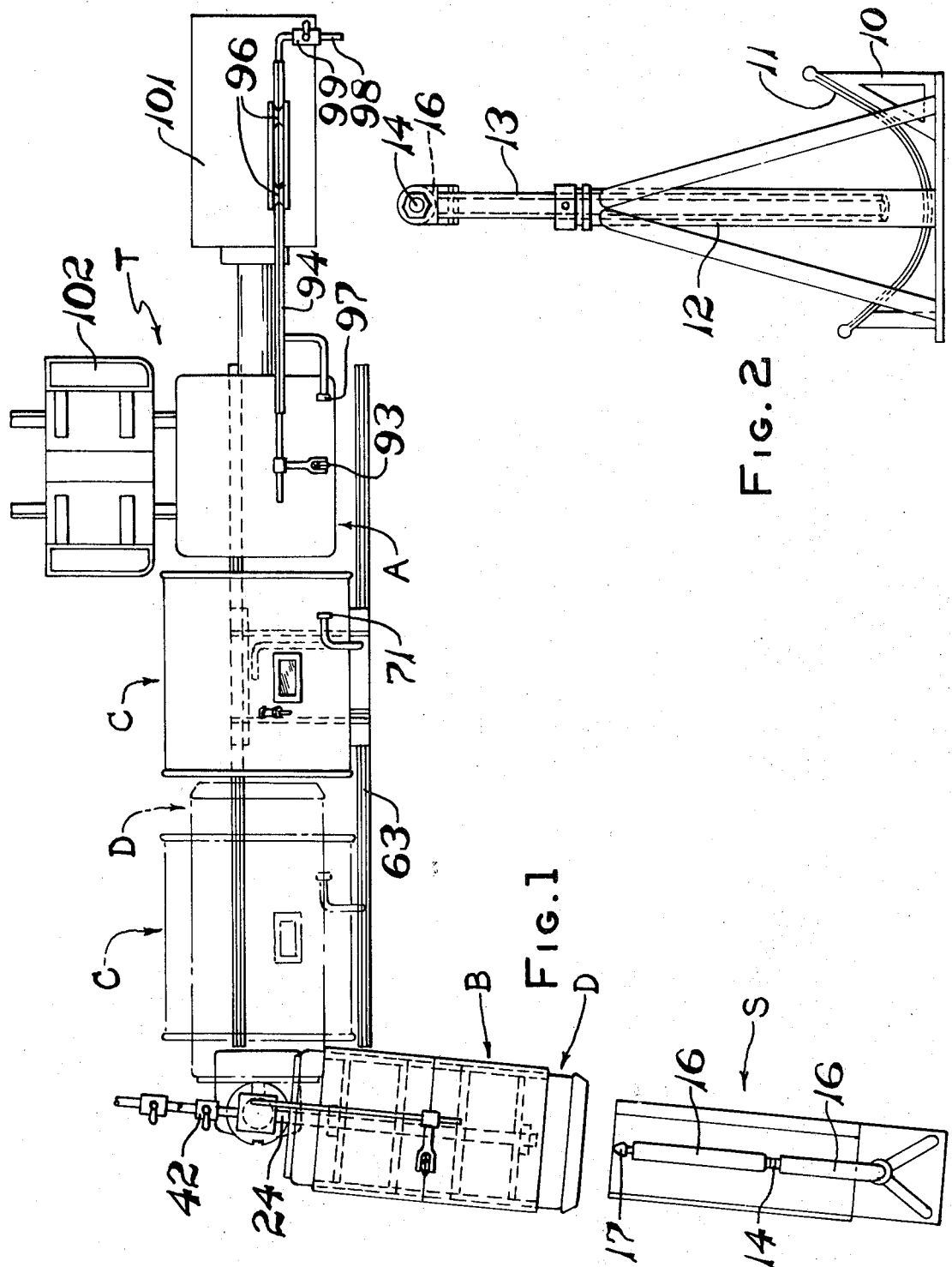

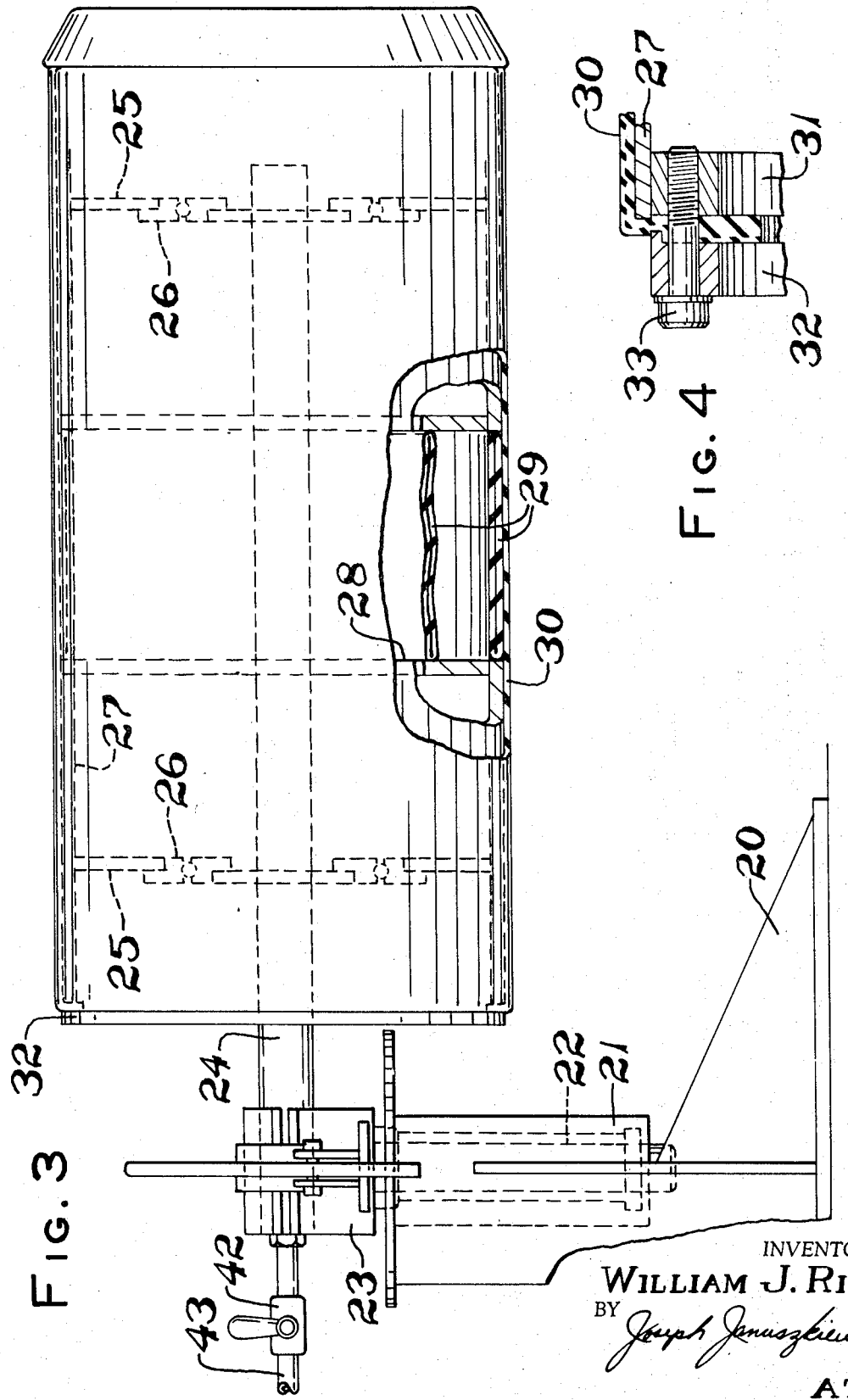

Sept. 29, 1970  W. J. RIDDLE  3,531,355
TIRE BAND APPLYING APPARATUS
Filed Nov. 2, 1966  6 Sheets-Sheet 6

INVENTOR.
WILLIAM J. RIDDLE
BY Joseph Januszkiewicz
ATTY.

United States Patent Office 3,531,355
Patented Sept. 29, 1970

3,531,355
TIRE BAND APPLYING APPARATUS
William J. Riddle, Cuyahoga Falls, Ohio, assignor to The B. F. Goodrich Company, New York, N.Y., a corporation of New York
Filed Nov. 2, 1966, Ser. No. 591,582
Int. Cl. B29h 17/20
U.S. Cl. 156—394
8 Claims

ABSTRACT OF THE DISCLOSURE

An inflatable member having control means for controlling the uniform radial expansion of the inflatable member to facilitate the transferring of an endless band of rubberized fabric material to a cylindrical carrier shell after which such shell is telescoped over a tire building drum for depositing such band onto such drum; and wherein an inflatable member through control means is adapted to be expanded in progressively stepped diameters to facilitate the support of the outboard end portions of plies as the diameter of the tire carcass on the tire building drum is increased to provide adequate support for the respective side edge portions of the plies as they are positioned and stitched into a smooth band during the tire carcass construction.

---

The present invention relates to a band builder and more particularly to an apparatus for transferring a band of elastomeric material to a tire building drum or a tire carcass, or to the building of bands on such drum in the process of building a tire carcass.

Many tires including the larger and heavier sizes are built by first positioning an endless band of multi-ply rubberized fabric material onto a tire building drum, after which additional bands of fabric are applied onto the previously applied band to build up the tire carcass with sufficient plies to provide sufficient body strength to the tire carcass. The tire carcass is completed by the application of additional strips of materials, beads and tread stock in a manner well understood in the art.

In the application of the bands of fabric plies, the cords lay as a portion of a helical spiral about the surface of the cylindrical building drum with the cords of adjacent plies conforming to spirals of opposite hand so as to form a criss-cross pattern as is well known in the art.

A means for applying such bands to a tire building drum or tire carcass employs the use of a roller bar; which tends to stretch the bands locally. Such operation is a laborious one and oftentimes impractical for heavy duty tires. Use has been made of centrifugal means to expand the bands as they are applied to the drum, but such means prevents proper control for the disposition of the bands onto the tire carcass. Other means employ the use of a plurality of circumferentially spaced spiders or bars as part of the application process which expand the bands for disposition onto a vacuum drum but such action usually tends to locally distort the band due to the non-uniform expansion of such bands. A further method and apparatus employs a band support member on which the individual bands were placed and arranged prior to processing after which such bands were transferred to a drum having an inflatable bladder, which upon inflation enlarges the band and transfers such band directly to a carrier shell. Such shell was of greater diameter than the band and the tire building drum to which such band was to be transferred. Such apparatus had certain limitations in applicability to the extremely large size tires due to the increase in size of band being handled as well as increase in bladder size together with the increase of bladder lengths and diameters which caused the bladders to sag downwardly to positions of appreciable greater eccentricity relative to the rotational axis of the tire building drum. With the upper portion of the band resting on the upper portion of the bladder, and upon inflation of the bladder, the bladder would expand uniformly and then progressively expand the band; however, the eccentricity would remain with respect to the axis of the drum. The carrier shell would then be moved into telescopic relationship with the bladder and band such that it would surround the bladder and band. Upon further expansion of the bladder and band, due to the initial eccentricity, the lower portion of the band would be the first to contact the inner surface of the surrounding carrier shell where the frictional force would clamp it in position and prevent further expansion of that portion. The adjacent portions of the band would continue to expand until they are in contact with the shell. This causes progressively greater expansion or stretch in the upper portions of the band, with the maximum stretch occurring at the top of the band, thereby resulting in a decrease in cord angle due to such greater expansion as well as resulting in a narrowing of the band and ply widths. Such resulting uneven expansion results in an undesirable variation in cord angle within the tire.

After expansion of the band into contact with the carrier shell the ends of the band would be cuffed and the bladder would be deflated to free the band from the bladder. The carrier shell and band would then be moved axially into a position encircling the tire building drum to transfer the band thereto. The variation in the cord angle imposed by the unequal stretching of the band would not be corrected nor compensated by the shrinkage or contraction thereof when such band would be transferred from the carrier shell to the tire building drum. Thereafter additional plies or bands would be applied and the tire would be completed in the conventional manner while still retaining a variation in the cord angle and thereby produce a dynamically unbalanced tire.

The present invention overcomes these difficulties yet retains simplicity of the apparatus through the use of an inflatable bladder in cooperation with an inflatable centralizing tube, wherein the centralizing tube controls the concentricity of the bladder during its radial expansion and assures an even radial expansion of the band thereby minimizing variation in cord angle as heretofore experienced in the processing of heavy duty off the road type of tires.

FIG. 1 is a plan view of a tire building station embodying the apparatus of the invention.

FIG. 2 is an end view of the band support apparatus.

FIG. 3 is a side view of the drum and an inflatable bladder assembly with a portion broken away showing the centralizing tube therein.

FIG. 4 is a fragmentary section showing the bladder mounting.

Figure 5:
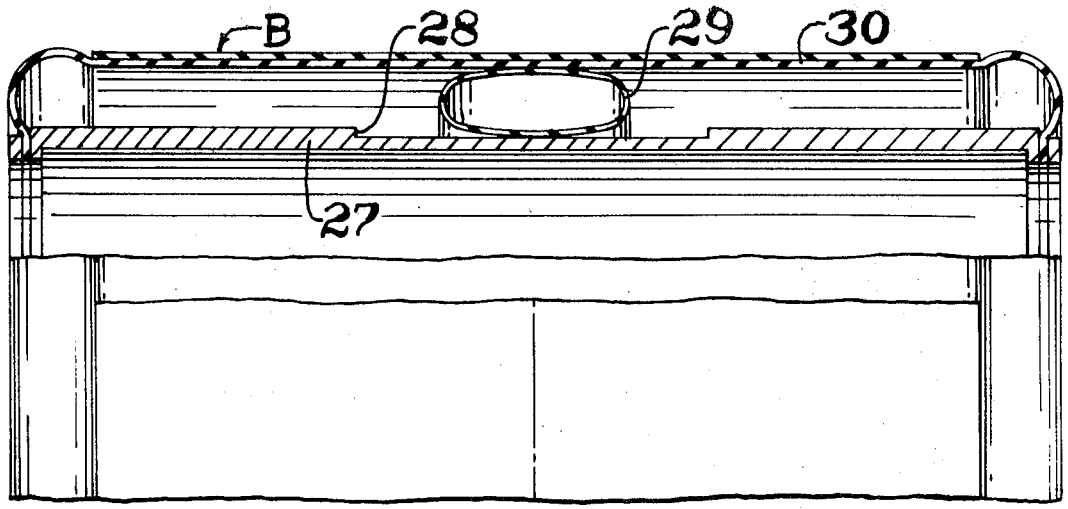
FIG. 5 is a fragmentary side elevation with a portion broken away showing the centralizing tube and bladder partially inflated with band thereon.

Referring to the drawings, wherein like reference characters designate like or corresponding parts throughout the several views, there is shown in FIG. 1, a band support S in alignment with an inflatable cylinder bladder D which bladder D has a band B thereon. The cylinder bladder D is pivotally supported so that it may be brought into axial alignment with a movable carrier shell C mounted on tracks. This enables the carrier shell C to be shifted over the cylinder D to receive the band upon inflation of the cylinder bladder D whereupon the carrier shell C is then moved axially such that the shell C will telescope over the tire building drum A of the tire buiding machine T where there is a transfer of the band from the shell C to the surface of the tire building drum A or the partially assembled tire carcass thereon.

The band support S includes a frame 10 carrying a cuved pan 11 for supporting a lower part of a suspended band. A vertical support 12 mounts a vertically adjustable post 13 which supports a horizontally extending arm 14 over which the band B is to be positioned. The arm 14 carries a plurality of elongated rollers 16 and a rotatable roller 17 at the forwardmost end portion thereof to facilitate initial adjustment in locating of the band prior to the transfer of such band to the cylinder bladder D.

The construction of the cylinder bladder D shown in FIGS. 3, 4, 5 and 6, comprises a cylinder supported on a pedestal 20 which is suitably secured to the floor. Pedestal 20 supports a vertically extending sleeve 21 in which pivots a vertical post 22 carrying a bracket 23 from which extends a horizontal shaft 24. Spiders 25 are pivotally mounted as by bearings 26 on the shaft 24 and fastened to a cylindrical sheet metal drum 27. The central peripheral portion of sheet metal drum 27 is recessed at 28 to accommodate an elastic expansible centralizing tube 29 such that such tube 29 in the deflated condition presents an outer surface that is coextensive with the outer periphery of drum 27. An elastomeric rubber bladder 30, surrounding such metal drum 27 and centralizing tube 29 (FIGS. 3 and 5), is clamped to the fixed end rings 31 of the drum 27 by means of clamp rings 32 through screws 33. The inflatable bladder 30 is made of an elastic rubber that does not tend to take a permanent set such as natural rubber, while the centralizing tube is made of a biased cord fabric which increases the stiffness of the tube and requires higher pressures thereby increasing its resistance to deformation by external loads. Such centralizing tube 29 by its shape, size and construction is a much more rigid member at any state of inflation than the main bladder 30. Also, the major radius of the tube 29 increases equally in all directions during expansion to maintain a major circumference concentric to the main axis of the cylinder D such to minimize variation in cord angle or in circularity or the concentricity of the circumference of the bladder 30.

Figure 9:
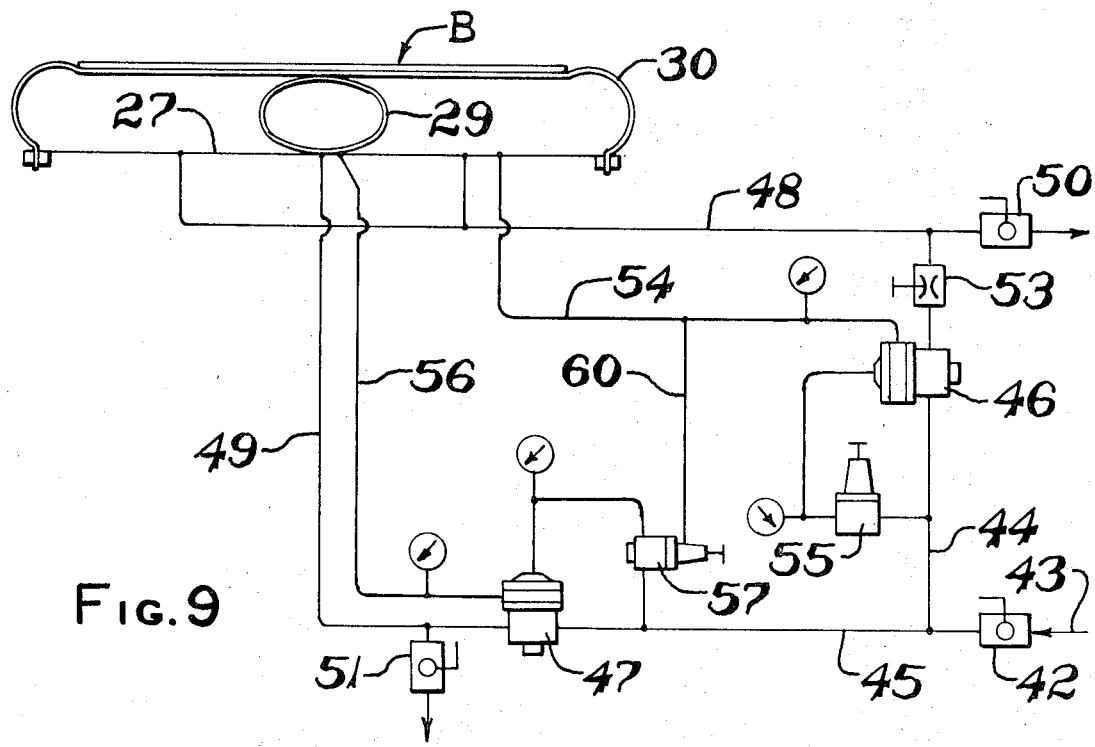
FIG. 9 is a schematic drawing of the control system for the band applying apparatus.

A control valve 42 is fitted to the drum shaft 24 for selectively inflating the bladder 30 and centralizing tube 29 through air supply pipe 43 which receives a pressure from a suitable source not shown. As seen in FIG. 9 the control valve 42 directs pressurized air via conduits 44 and 45 to control regulator valves 46 and 47 which in turn directs such pressurized air via conduits 48 and 49 to the main bladder 30 and the centralizing tube 29, respectively. Deflation is accomplished by closing control valve 42 and opening of valves 50 and 51 on conduits 48 and 49, respectively. Downstream of regulator valve 46 is a throttle valve 53 which sets up a back pressure in conduit 44 to insure sufficient pressure in conduit 45 which controls the expansion of tube 29. Bladder 30 is connected by conduit 54 to the upper portion of control valve 46 which sets up a pilot pressure on one side of a diaphragm contained therein. Such pilot pressure is opposed by a pressure supplied by an adjustable regulator valve 55 which interconnects conduit 44 with control valve 46. When the pressure from regulator valve 55 is balanced by the pilot pressure to valve 46 supplied from conduit 54 and from bladder 30, such valve 46 operates to shut off the flow of air from conduit 44 to the bladder 30. Centralizing tube 29 is operatively connected by a conduit 56 to control valve 47 which exerts a pilot pressure on the upper end portion of a diaphragm contained therein. A control valve 57 operatively interconnects conduit 45 with control valve 47 to supply a control pressure which when balanced by the pilot pressure from conduit 56 operates to shut off the flow of air from conduit 45 to the tube 29. A conduit 60 interconnects conduit 54 with control valve 57 that determines the relative pressures between bladder 30 and centralizing tube 29. This is to assure that sufficient pressure is delivered to the tube 29 to assume control of the expansion of the bladder 30. As one example of this, valve 57 may be set so that the pressure in tube 29 at any instant of inflation is twice that of the pressure in bladder 30 plus the additional amount of pressure as determined by the setting of the adjustable valve 57. During the inflation period, centralizing tube 29 relative to bladder 30 is maintained at a higher pressure to assure the contact of the tube 29 with the bladder 30. In addition, tube 29 expands radially in all directions equally maintaining bladder 30 concentric therewith, which action stretches band B uniformly, minimizing eccentricity and variation of cord angle.

Figure 8:
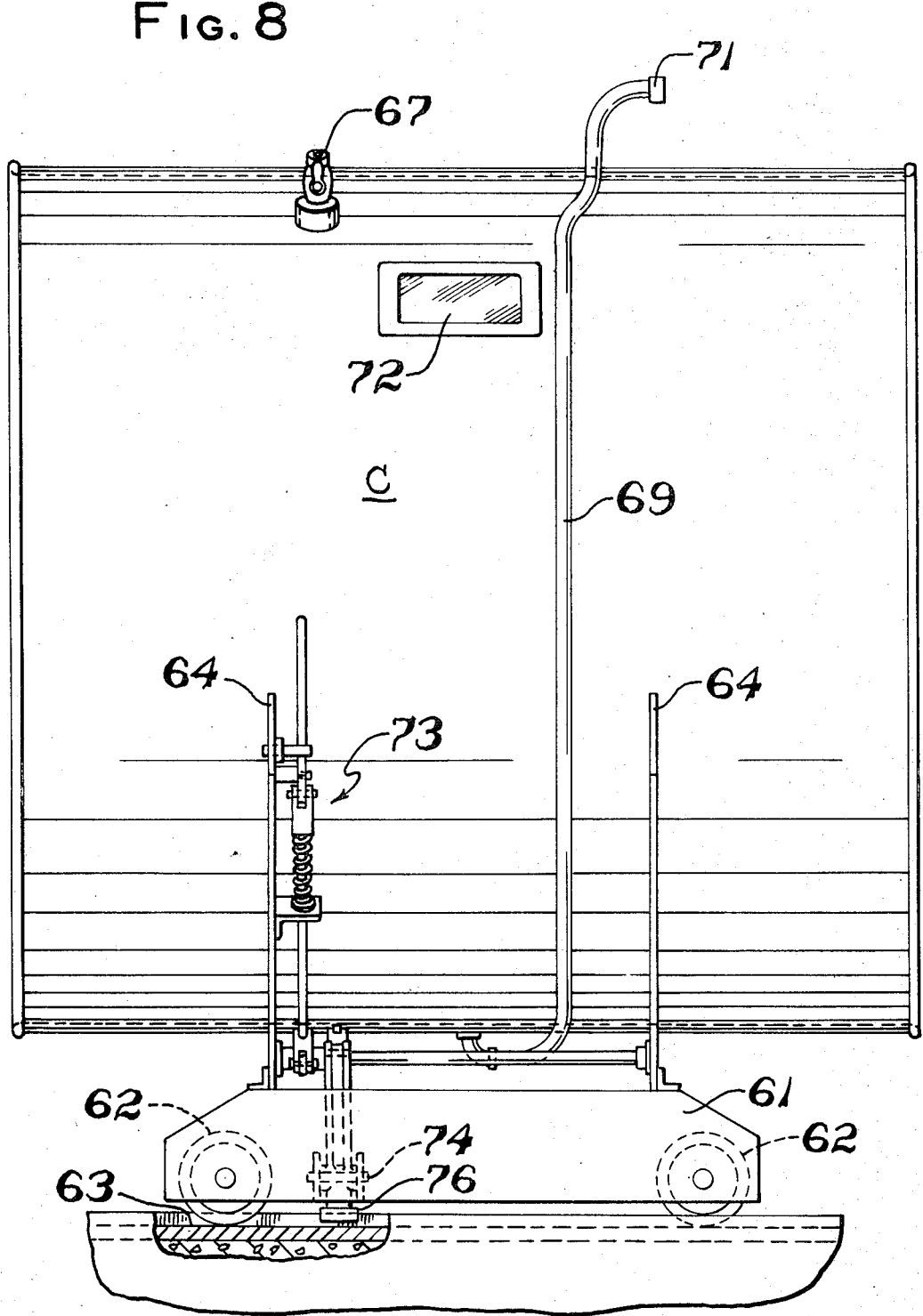
FIG. 8 is a side view of the transfer shell.

The transfer shell C (FIGS. 1 and 8) comprises a cylindrical metal shell which is mounted on a carriage 61 which has wheels 62, guided by grooved tracks 63 embedded in the floor. Such carriage 61 is guided for movement into telescopic relationship with the tire building drum A. Upstanding brackets 64 on the carriage 61 support the metal transfer shell C which shell C has an exhaust valve 67 near the top thereof. Air under pressure may be introduced near the bottom of the shell by means of an air pipe 69 which terminates in a quick disconnecting coupling 71. One or more windows 72 are formed in the shell for observing the guide lines which may be placed on the band when the band is being built. A suitable brake system designated generally as 73 in FIG. 8 is mounted onto the carriage and pivoted as at 74 and having brake shoes 76 at the lower ends for frictional engagement to the sides of the tracks to control the stopping of such shell C. For a more detailed description thereof refer to U.S. Pat. 3,070,478.

Details of the tire building machine are not described herein with the exception of the tire building drum designated A in FIG. 1 and a wheel 93 which is supported over the drum in the usual manner. The wheel 93 is mounted on an adjustable horizontal support 94 carried in opposed rollers 96 (only the upper rollers appear) so that the support can be brought out from its retracted position to a position corresponding to the midplane of the tire building drum. Adjustable stop means not shown are provided to retain the support 94 in the selected center position. The arm support serves as an air supply for the transfer carriage. The arm support 94 is hollow and connects to a quick disconnect coupling 97 arranged to connect to coupling 71 on the carrier shell C. Air is supplied to the hollow arm support 94 by conduit 98 which may be controlled by a valve 99. The tire building machine includes the usual drum drive mechanism 101 and turn down stitching mechanism 102. A further modification in the construction of the cylinder bladder D includes the use of a plurality of tubes to provide controlled lateral expansion.

Figure 6:
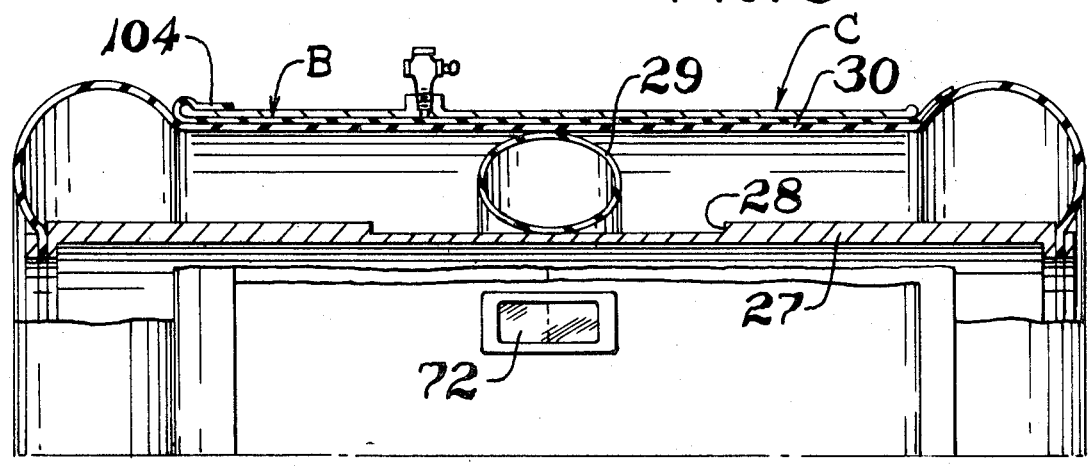
FIG. 6 is a fragmentary side elevation showing the tube and bladder fully inflated with the transfer shell telescoped over the band.
Figure 7:
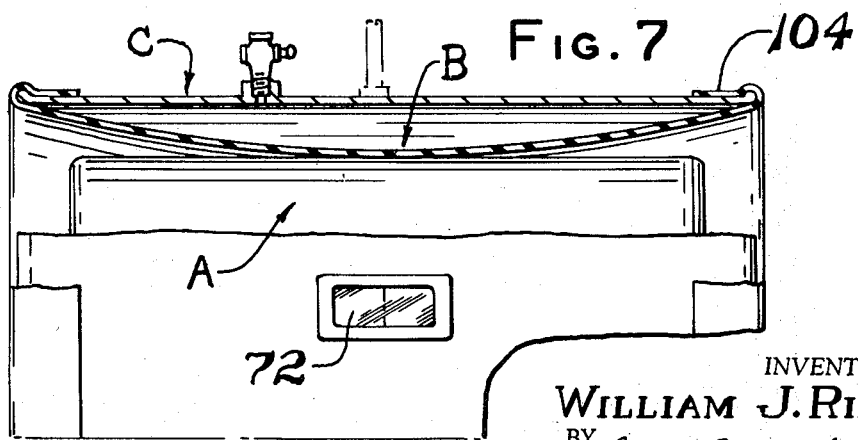
FIG. 7 is a fragmentary side elevation, with a portion broken away, of the transfer shell telescoped over the tire building drum with the band being transferred to such drum.

In the operation of the device, initially band B, built on a separate band building machine, is positioned on the band support S and straightened out preparatory to the application processes. Cylinder D is pivoted (into the position shown in full lines in FIG. 1) into alignment with the band support S such that the band B may be centered thereon as shown in FIG. 1. As noted, the cylinder D is wider than the band which is to be applied to the tire building machine and smaller in diameter than the band to facilitate the handling of such band. Valve 42 on shaft 24 is open to direct pressurized air into conduits 44 and 45 to gradually inflate bladder 30 and centralizing tube 29. A throttle valve 53 on conduit 44 insures a back pressure in conduit 44 to maintain sufficient pressure in conduit 45 which controls the expansion of tube 29 and bladder 30 such that the centralizing tube 29 at all times is maintained at a higher pressure than that in bladder 30. As discussed in more detail above the ratio of pressures between the centralizing tube 29 and bladder 30 is such to insure that the band maintains contact with the bladder without distortion thereby maintaining a radial expansion of the bladder 30 equally in all directions thereby minimizing variation in cord angle. Cylinder D is then pivoted into axial alignment with the carrier shell C and the tire building drum A. After which shell C is telescoped over the cylinder D. With the carrier shell C positioned over the cylinder D, valve 42 is again open to continue inflation of bladder 30 and the centralizing tube 29 until the band engages the interior surface of the carrier shell C. Exhaust valve 67 on the carrier shell will be opened to permit full contact between the band and the carrier shell C while the inflation of the bladder 30 and the centralizing tube 29 will be continued until sufficient pressure is exerted against the band to assure complete engagement between the band and the carrier shell C. When this occcurs, the amount of air is increased to insure smooth nonwrinkled transfer of the band to the shell. Valve 42 is then turned off to cut off inflation. The ends of the band are then cuffed around the ends of the shell as at 104 as indicated in FIGS. 6 and 7. The bladder 30 and the centralizing tube 29 is then deflated by opening valves 50 and 51 to atmosphere. The cuffs 104 combined with the atmospheric pressure acting on the inner surface of the band maintains the band in contact with the carrier shell C. The carrier shell C is then telescoped over the tire building drum A and centered thereon after which the brake 73 is applied, locking the carrier shell into position over the drum A. The couplings 71 and 97 are then connected to give an air supply to the carrier shell such that upon opening of valve 99 pressurized air is admitted to pipe 69 causing the band to contract and move towards the tire building drum A as seen in FIG. 7. The engagement begins in the central zone of the band and moves progressively outwardly towards the respective side portions of the drum such as to eliminate the trapping of air between the band and the tire building drum. Such transfer of the band is done gradually and uniformly without distortion to the cords and without deformation. Upon transfer of the band to the tire building drum, the air supply valve 99 is closed and the cuffs 104 are turned away from the ends of the carrier shell C. The carriage brake 73 is released and the carrier shell C moved clear, whereupon the ends of the band can be turned down around the ends of the drum and stitched thereto in the usual manner through the stitching mechanism 102. The cylindrical drum D is then pivoted into position to receive a further band to repeat the process as outlined above.

A further modification of the invention comprises the use of a tire building drum A with a pair of axially movable rings D'. The means for moving the rings D' toward and away from the drum A can be by any conventional means. Each ring D' has an elastomeric rubber bladder 30' surrounding such ring D' and clamped thereto as bladder 30 to drum 27 described above. Located within bladder 30' and on ring D' is a plurality of axially aligned tubes 29'. The means for controlling the inflation of such tubes 29' and bladder 30' is similar to that described in the first embodiment of the invention, although it is contemplated to use other control systems which can control the rate and degree of expansion of the tubes and bladder incrementally in steps as desired.

Figure 10:
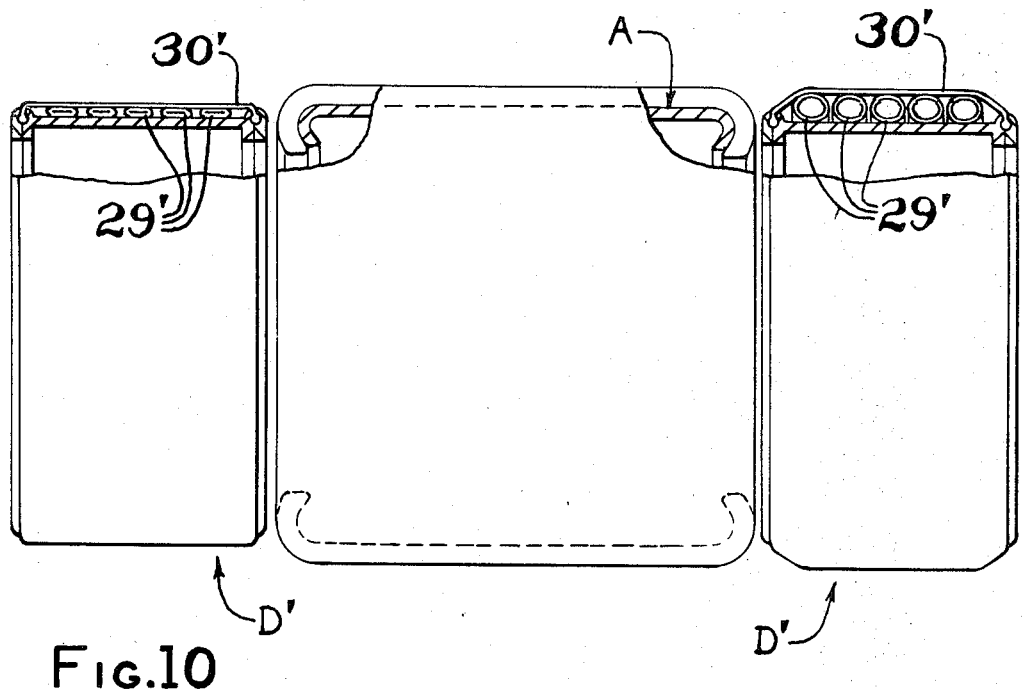
FIG. 10 is a schematic drawing of the invention as applied to a tire building apparatus showing rings with inflatable means thereon facilitating the building of bands during single ply construction of a tire carcass.
Figure 11:
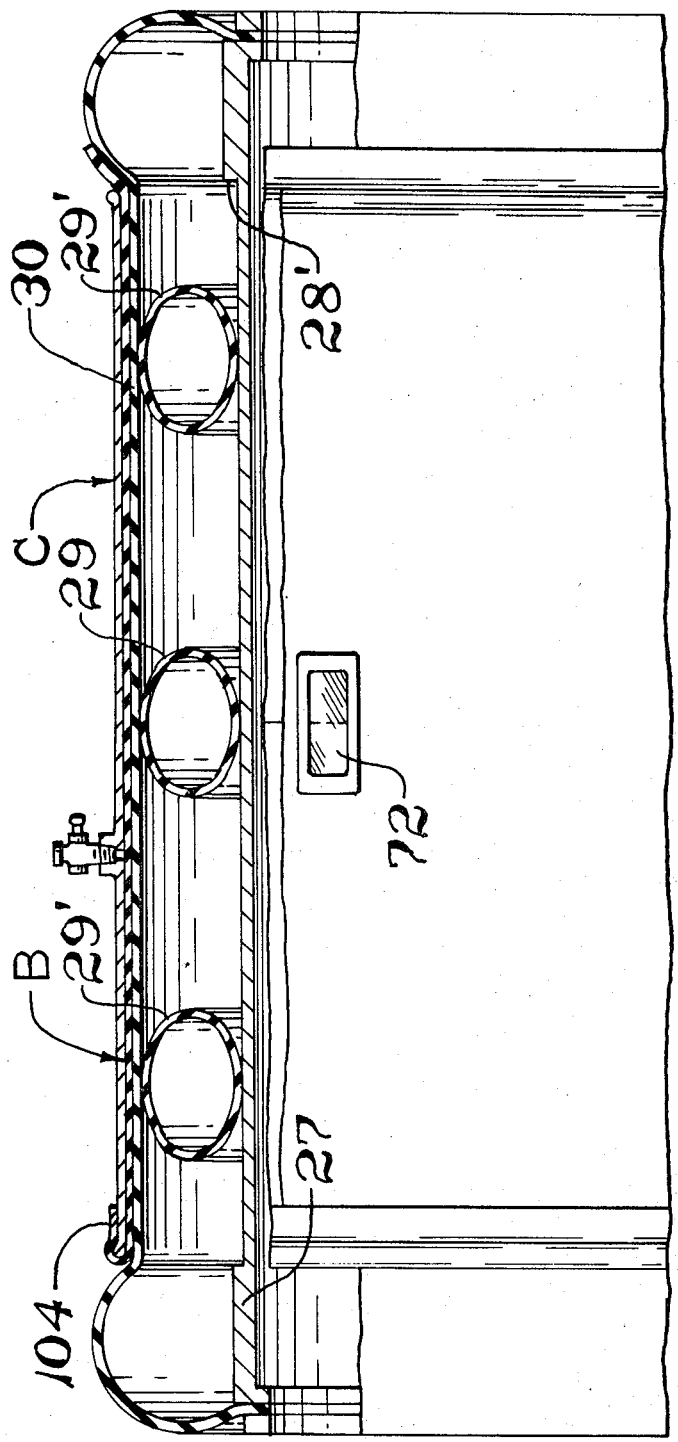
FIG. 11 is a fragmentary side elevation with a portion broken away showing a plurality of centralizing tubes and the bladder partially inflated with a band thereon.

Such drum A and ring D' facilitates the construction of a tire carcass which require numerous plies as in off the road tires. Heretofore ply rings of fixed diameters were used which were satisfactory for use on tire construction having few plies; however, for heavier tires of many plies, the progressive increase of carcass thickness on the tire building drum A would result in a substantially greater diameter and circumference so that the plies were not adequately supported at the respective side edge portions and therefore would not be properly positioned and stretched into a smooth band. Known expandable ply support rings depend upon mechanical means for enlargement and were generally heavy, expensive and difficult to operate. In the instant application of the bladder 30' and tubes 29', the rings D' would be deflated as depicted in the left ring as shown in FIG. 10 wherein such rings D' would support the respective ends of the band that extend beyond the tire building drum, and as sufficient bands are applied thereto, the rings D' would be moved axially away from the drum A to permit turn down of the plies, placement of the bead and the subsequent turn up. The rings D' are then moved axially towards the drum A and inflated sufficiently to present a peripheral surface that is flush with the drum A and the plies thereon, such that upon application of further plies, a continuous even surface is presented. The above process of increasing the size of the bladder 30' on ring D' assures a working surface that is continuous, smooth and even. The right hand portion of FIG. 10 illustrates the tire carcass built up with the tubes 29' and bladder 30' inflated to present a continuous surface.

A further modification of the above described embodiment contemplates the use of a plurality of tubes 29' which upon full inflation produce a well flattened cross-sectional shape which therefore requires fewer tubes 29' for a given width of the bladder 30' than the cross-sectional shape illustrated in FIG. 10. Another modification is to replace the outer bladder 30' with overlapping leaves or members of thin formed spring metal with each leaf member anchored on one end so as to be able to slide relative to the adjacent leaf member thereby presenting a substantially cylindrical surface, the diameter of which would be variable depending upon the degree of inflation of the underlaying tubes 29'.

I claim:

1. An apparatus for uniformly stretching bands of elastomeric fabric material prior to application to a tire building drum for the building of a tire carcass comprising, a cylindrical support, means for supporting said cylindrical support at one end thereof, an inflatable bladder mounted on said cylindrical support and surrounding said cylindrical support, an inflatable tube surrounding said cylindrical support at the central portion thereof, said inflatable tube located between said inflatable bladder and said support, and means for controlling simultaneous the inflation of said inflatable bladder and said inflatable tube.

2. An apparatus for applying a band as set forth in claim 1 wherein said inflatable tube comprises an elastomeric fabric covered member being more rigid than said inflatable bladder to control the expansion of said bladder uniformly.

3. An apparatus for applying bands to a tire building drum as set forth in claim 2 wherein said cylindrical support has a circumferentially extending groove along the central portion thereof to locate said inflatable tube therein, said inflatable tube having its outer periphery concentric with the outer peripheral surface of said cylindrical support to present a uniform diameter to said inflatable bladder member.

4. An apparatus as set forth in claim 3 wherein said control means for inflating said bladder and tube is operative to pressurize said tube to a greater pressure relative to the pressure in said bladder.

5. An apparatus for uniformly stretching the bands of fabric ply for use in the manufacture of pneumatic tires and transferring such bands to a carrier shell, comprising an axially movable carrier shell, a band transferring cylinder pivotally mounted adjacent to said carrier shell, an inflatable bladder mounted on said cylinder and surrounding said cylinder, an inflatable member surrounding said cylinder at the central portion thereof, said inflatable member located between said inflatable bladder and said cylinder, and means for controlling the radial uniform inflation of said inflatable member and said inflatable bladder along its entire peripheral surface to uniformly stretch such fabric ply band for transferring such ply bands to the inner peripheral surface of said carrier shell.

6. An apparatus as set forth in claim 5 wherein said inflatable member includes a plurality of axially spaced tubes operative to maintain uniform inflation of said bladder upon inflation thereof.

7. An apparatus as set forth in claim 5 wherein said inflatable member is an inflatable tube located centrally under said bladder operative upon inflation to maintain said bladder concentric to the central axis of rotation of said transferring cylinder.

8. An apparatus for uniformly stretching the bands of a fabric ply for use in the manufacture of pneumatic tires and for transferring such bands to a carrier shell, comprising an axially movable carrier shell, a band transferring cylinder pivotally mounted adjacent to said carrier shell, an inflatable bladder mounted on said cylinder and surrounding said cylinder, an annular tube located centrally on said cylinder, said tube being of a more rigid material than said bladder, and pressure control means operative to inflate said tube and said bladder progressively with said pressure in said tube being greater than said pressure in said bladder to uniformly stretch such fabric ply band for transferring such ply band to the inner peripheral surface of said carrier shell.

References Cited

UNITED STATES PATENTS

| | | | |
|---|---|---|---|
| 2,028,078 | 1/1936 | State et al. | 156—396 |
| RE19,895 | 3/1936 | State | 156—412 X |
| 3,070,478 | 12/1962 | Riddle | 156—412 X |
| 3,077,917 | 2/1963 | Appleby | 156—416 |

FOREIGN PATENTS

| | | |
|---|---|---|
| 1,043,423 | 9/1966 | Great Britain. |
| 663,565 | 8/1938 | Germany. |

BENJAMIN A. BORCHELT, Primary Examiner

S. C. BENTLEY, Assistant Examiner

U.S. Cl. X.R.

26—63; 156—416